G. J. BANCROFT.
PNEUMATIC CUSHION FOR VEHICLES.
APPLICATION FILED MAR. 18, 1908.

980,138.

Patented Dec. 27, 1910.

2 SHEETS—SHEET 1.

Witnesses
Otto E. Haddick
Dena Nelson

Inventor
Geo. J. Bancroft
Attorney

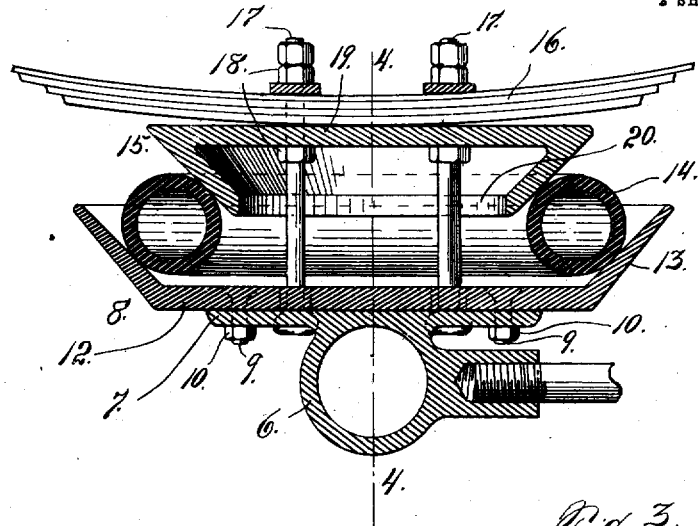
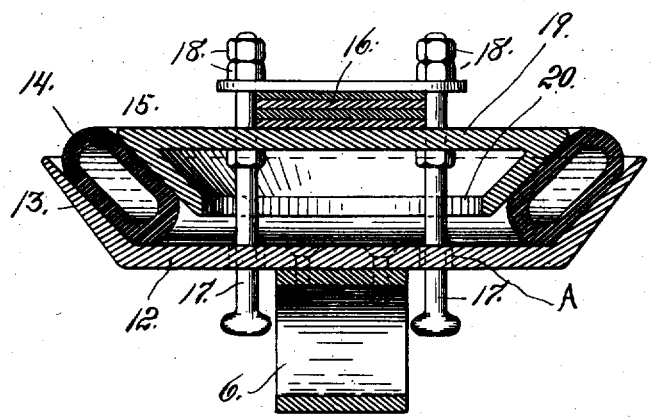

UNITED STATES PATENT OFFICE.

GEORGE J. BANCROFT, OF DENVER, COLORADO.

PNEUMATIC CUSHION FOR VEHICLES.

980,138. Specification of Letters Patent. Patented Dec. 27, 1910.

Application filed March 18, 1908. Serial No. 421,958.

*To all whom it may concern:*

Be it known that I, GEORGE J. BANCROFT, a citizen of the United States, residing in the city and county of Denver and State of Colorado, have invented certain new and useful Improvements in Pneumatic Cushions for Vehicles; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to improvements in pneumatic cushions interposed between the axles and the springs of automobiles or other vehicles, the object being to locate the pneumatic elements just above the axles and near the opposite ends thereof, whereby a cushion effect is produced similar to that resulting from the use of pneumatic tires. Where my improvement is employed the pneumatic tires may be dispensed with.

It is well known that the liability to puncture makes the pneumatic tire objectionable on vehicles. In my improved construction I employ a pneumatic element so located that it cannot be punctured since it is supported as above indicated, entirely above the ground and it is impossible to puncture it. In the specific construction shown, I interpose a circular pneumatic tube between a dish-shaped seat secured to the axle, and a cone-shaped bearing attached to each spring of the vehicle, the tube being of sufficient size and properly inflated, to give the desired cushion effect, without the use of pneumatic tires.

Having briefly outlined my improved construction, I will proceed to describe the same in detail reference being made to the accompanying drawing in which is illustrated an embodiment thereof.

Figure 1:
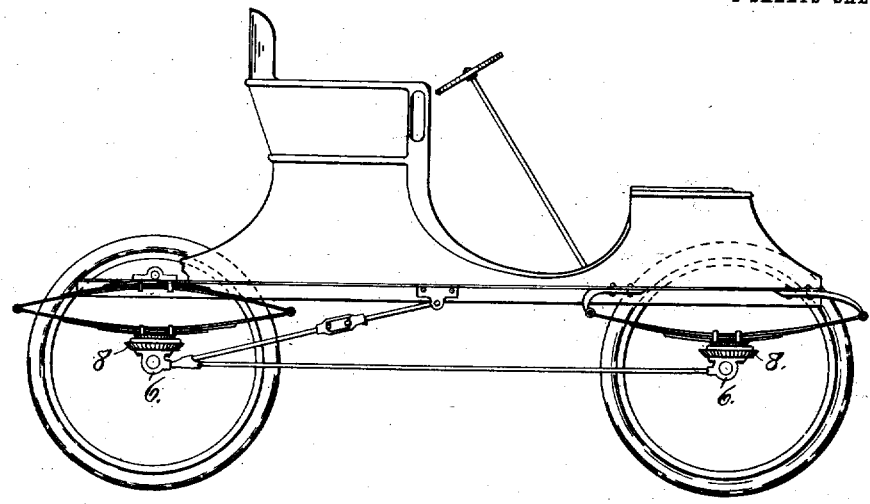
Figure 2:
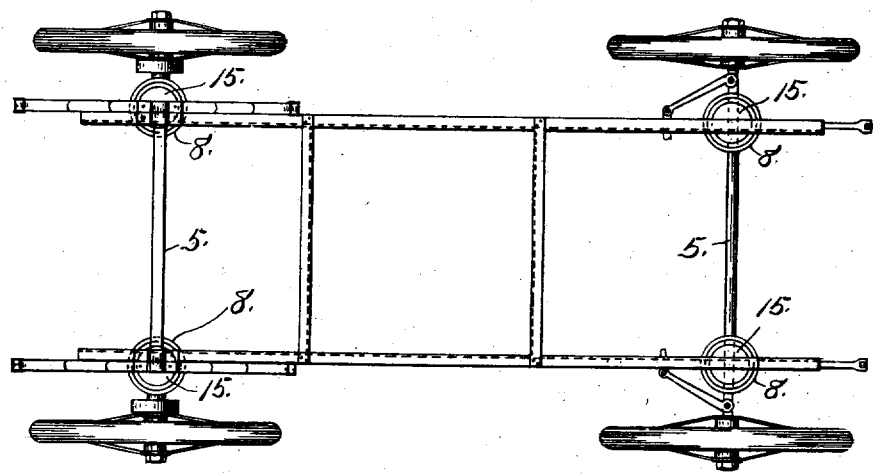

In this drawing, Figure 1 is a side elevation of a vehicle equipped with my improvements. Fig. 2 is a top plan view of the same with the body removed. Fig. 3 is a vertical section on a larger scale taken through one of the pneumatic elements and the parts with which it is connected. In this view the pneumatic tube is in the fully expanded position. Fig. 4 is a section taken on the line 4—4 Fig. 3, the pneumatic tube being compressed whereby the cone-shaped bearing and the seat are caused to approach each other.

The same reference characters indicate the same parts in all the views.

Let the numeral 5 designate the axles of a vehicle as an automobile.

As shown in the drawing the numeral 6 designates a bearing for one extremity of either axle. The upper part of this bearing is provided with horizontally arranged flanges 7 to which is secured a dish-shaped member 8 by means of screws 9 to which are applied nuts 10, the said screws being passed through the bottom of the dish-shaped element. The rim or upwardly-projecting part 13 of the element 8 extends outwardly as it projects upwardly whereby the part is outwardly flared or inclined. This element forms a seat for a circular pneumatic tube 14, upon which rests a cone-shaped bearing 15 secured to the spring 16 by bolts 17 to which nuts 18 are applied above the spring and also below the top 19 of the bearing 15. This bearing is hollow and open at the bottom as shown at 20. The bolts 17 pass through unthreaded openings A formed in the bottom 12 of the seat 8, the said openings being considerably larger than the bolts, whereby these bolts are allowed to move freely not only downwardly through the bottom of the seat but are also allowed a lateral rocking movement in all directions when sufficient force is applied to cause the elements 15 and 8 to approach each other at any point. There is a special advantage in employing the circular shape of pneumatic tube, since this particular shape arrests shocks in all directions whether laterally or vertically applied. The only function of these bolts is to connect the elements 8 and 15 with the spring 16 and prevent the possible separation of the said elements. The hollow cone-shaped member 19 and the member 12 form an air chamber which is tightly sealed by the tube 14 when the two members 12 and 19 approach each other, thereby causing the air to be compressed therein and assisting in arresting the shocks to the vehicle.

From the foregoing description the use and operation of my improvement will be readily understood. When the vehicle is in use, the vibration incident to the roughness of the road is taken up by the tubes 14 which as indicated in the drawing are four in number, two being over each axle and one beneath each spring.

Having thus described my invention, what I claim is:

The combination with a vehicle, of a hollow member having inclined sides outwardly flared from the bottom of the member, the latter being open at the top and secured to the running gear of the vehicle, a pneumatic tube seated in said member and engaging the inclined sides thereof, a hollow, inverted bearing open at the bottom, secured to a spring of the vehicle, the said bearing having inclined sides, inwardly flared from the base thereof, the outer surface of its inclined walls engaging said tube, the coöperating bearing and hollow member being of counterpart shape and separated by the said tube, connecting bolts passing through the bearing and hollow member, the openings in the hollow member, through which the bolts pass, being considerably larger in diameter than the said bolts, to allow the bearing and hollow member an independent movement, whereby the vibrations incident to the travel of the vehicle are taken up by the pneumatic tube.

In testimony whereof I affix my signature in presence of two witnesses.

GEORGE J. BANCROFT.

Witnesses:
A. J. O'BRIEN,
DENA NELSON.